US011297153B2

(12) United States Patent
Maria (10) Patent No.: US 11,297,153 B2
(45) Date of Patent: Apr. 5, 2022

(54) EVOLVED PACKET CORE APPLICATIONS MICROSERVICES BROKER

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 481 days.

(21) Appl. No.: 15/076,797

(22) Filed: Mar. 22, 2016

(65) Prior Publication Data
US 2017/0279910 A1    Sep. 28, 2017

(51) Int. Cl.
| | | |
|---|---|---|
| H04L 29/08 | (2006.01) | |
| H04L 67/562 | (2022.01) | |
| H04L 67/02 | (2022.01) | |
| H04L 43/0811 | (2022.01) | |
| H04L 67/563 | (2022.01) | |
| H04L 45/00 | (2022.01) | |

(52) U.S. Cl.
CPC ...... *H04L 67/2809* (2013.01); *H04L 43/0811* (2013.01); *H04L 45/22* (2013.01); *H04L 67/02* (2013.01); *H04L 67/2814* (2013.01)

(58) Field of Classification Search
CPC . H04L 67/2809; H04L 43/0811; H04L 45/22; H04L 67/02; H04L 67/2814
USPC ......................................................... 709/219
See application file for complete search history.

(56) References Cited

U.S. PATENT DOCUMENTS

| | | | |
|---|---|---|---|
| 2010/0211637 A1* | 8/2010 | Borzsei | G06Q 50/01 709/204 |
| 2010/0299437 A1 | 11/2010 | Moore | |
| 2012/0180071 A1 | 7/2012 | Lesandro et al. | |
| 2013/0090124 A1 | 4/2013 | Panchal et al. | |
| 2014/0003313 A1* | 1/2014 | Jain | H04W 28/08 370/311 |
| 2014/0259012 A1 | 9/2014 | Nandlall et al. | |
| 2015/0065106 A1* | 3/2015 | Catovic | H04W 8/22 455/418 |
| 2015/0103780 A1 | 4/2015 | Kaippallimalil et al. | |

(Continued)

OTHER PUBLICATIONS

Kablan et al., "The Cloud Needs a Reputation System," arXiv:1509.09057v1 [cs.NI], Sep. 30, 2015.

(Continued)

*Primary Examiner* — Kevin S Mai
(74) *Attorney, Agent, or Firm* — Hartman & Citrin LLC (57) ABSTRACT

Concepts and technologies disclosed herein are directed to an evolved packet core ("EPC") applications microservices broker ("microservices broker"). According to one aspect of the concepts and technologies disclosed herein, a microservices broker can receive a microservice request that identifies a microservice. The microservices broker can check a microservices broker database for a user equipment ("UE") that is capable of servicing the microservice request. The microservices broker can request a status of the UE from a home subscriber server ("HSS"). The status can indicate whether or not the UE is connected to a radio access network ("RAN"). If the status indicates that the UE is connected to the RAN, the microservices broker can route the microservice request to the UE for providing the microservice.

19 Claims, 6 Drawing Sheets

(56) References Cited

U.S. PATENT DOCUMENTS

| | | | |
|---|---|---|---|
| 2015/0142871 A1* | 5/2015 | Tofighbakhsh | H04W 4/60 709/203 |
| 2015/0242255 A1 | 8/2015 | Lesandro et al. | |
| 2015/0365820 A1* | 12/2015 | White | H04W 76/10 455/419 |
| 2015/0373532 A1 | 12/2015 | Astrom et al. | |
| 2018/0191666 A1* | 7/2018 | Rahman | H04L 61/1511 |

OTHER PUBLICATIONS

Sridhar, Kamakshi, "Introduction to Evolved Packet Core (EPC): EPC Elements, protocols and procedures," Aug. 2012, Alcatel-Lucent, 2009.

Toffetti, Giovanni, "Mobile Cloud Networking (MCN): Motivation, Vision, and Challenges," Nov. 2012-Oct. 2015, Mobile Cloud Networking, 2012-2015.

* cited by examiner

EVOLVED PACKET CORE APPLICATIONS MICROSERVICES BROKER

BACKGROUND

Over the last decade there has been a significant evolution regarding how mobile applications are written. A common approach has been to use an intermediary gateway such as a mobile applications development gateway ("MADP") to provide backend services between a mobile device and corporate sources of data. Another approach has been to use content rich hypertext markup language ("HTML") 5 services to provide backend data access between the mobile device and enterprise data sources without the use of an intermediate gateway such as the MADP.

During the last couple of years, mobile application development has been steadily moving toward the use of what the industry refers to as microservices user architecture. Microservices can be lightweight hypertext transfer protocol ("HTTP") based applications that by design perform a single simple function. When a developer writes a mobile application that requires multiple services, an "integration" set of utilities or services are used to provide these services. The integration takes place by the developer using multiple sources of data from backend services. The mobile carrier is not involved in this process. In this context, the approach is somewhat similar to using service-oriented architecture ("SOA") calls, where specific services are used for a composite mobile application.

The MADP gateway approach and the microservices approach disintermediate the mobile carrier. In both of these instances, the carrier just passes the data through the radio access network ("RAN") and the core network, and therefore does not experience any benefit therefrom.

SUMMARY

Concepts and technologies disclosed herein are directed to an evolved packet core ("EPC") applications microservices broker. According to one aspect of the concepts and technologies disclosed herein, a microservices broker can receive a microservice request that identifies a microservice. The microservices broker can check a microservices broker database for a user equipment ("UE") that is capable of servicing the microservice request. The microservices broker can request a status of the UE from a home subscriber server ("HSS"). The status can indicate whether or not the UE is connected to a RAN. If the status indicates that the UE is connected to the RAN, the microservices broker can route the microservice request to the UE for providing the microservice. Alternatively, if the status indicates that the UE is not connected to the RAN, the microservices broker can route the microservice request to an application server for providing the microservice.

In some embodiments, the microservices broker can instruct an EPC gateway to intercept microservice requests such as the microservice request. In these embodiments, the microservices broker can receive the microservice request from the EPC gateway that intercepted the microservice request. The EPC gateway can be a serving gateway ("SGW"), a packet gateway ("PGW"), or a combination thereof.

In some embodiments, the microservices broker can receive a further microservice request that identifies a further microservice. The microservices broker can check the microservices broker database for a further UE that is capable of servicing the further microservice request. The microservices broker can request a further status of the further UE from the HSS. The microservices broker can determine, based upon the further status of the further UE, whether the further UE is attached to the RAN. In response to determining that the user equipment is attached to the RAN, the microservices broker can route the further microservice request to the further UE for providing the further microservice. In some embodiments, the UE providing the microservice and the further UE providing the further microservice constitute providing a composite service comprised of the microservice and the further microservice.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein are directed to an EPC applications microservices broker. Mobile microservices applications are a new trend in mobile computing. The microservices architecture relies on small, single-purpose, lightweight HTTP mobile applications that perform a single function and do it well. Microservice applications are not composite applications, meaning that microservice applications are not intended to be complex entities performing multiple services, but rather simple applications that perform single services that communicate with backend corporate servers to perform a single function. Developers can use multiple microservice applications to create complex applications and backend services. A developer can use continuous integration tools to create more complex mobile applications using tools that reside in a backend server.

The concepts and technologies described herein provide a new network element residing in the carrier's EPC that orchestrates the integration of microservices, therefore eliminating the need to use backend enterprise server tools for integration and adding value to services provided by carriers. The new network element is referred to herein as an EPC applications microservices broker (or simply "broker"). The broker keeps track of the microservices available in mobile devices, with which enterprise backend services these microservices are associated, and what security settings are appropriate. The broker dynamically creates composite applications consisting of multiple microservices. These composite applications can be created dynamically in response to conditions in the mobile devices or by previously provisioned parameters.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
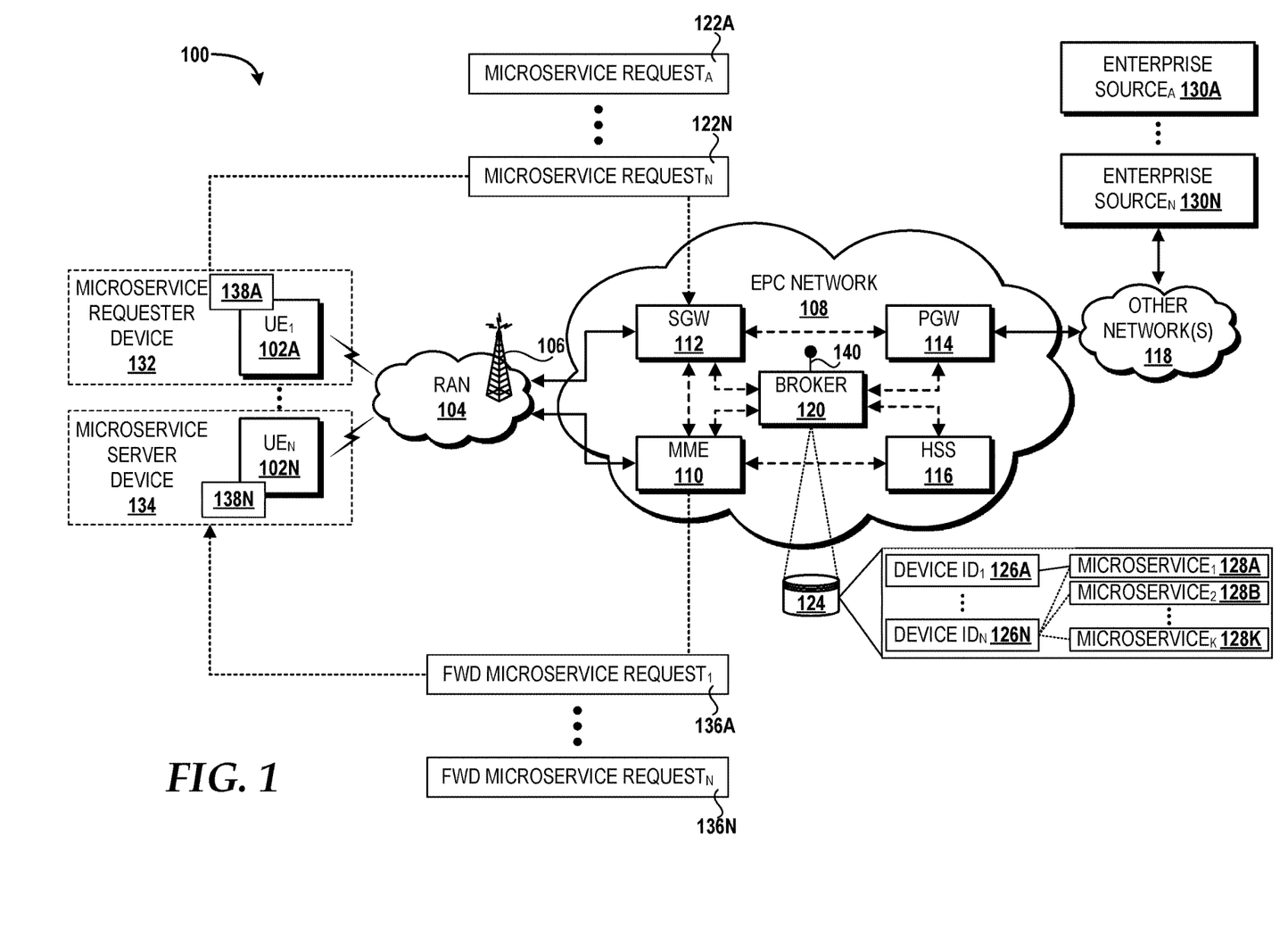
FIG. 1 is a block diagram illustrating an operating environment in which aspects of the concepts and technologies disclosed herein can be implemented.

Turning now to FIG. 1, a block diagram illustrating an operating environment 100 in which aspects of the concepts and technologies disclosed herein can be implemented will be described. The operating environment 100 includes a plurality of user equipment devices ("UEs") 102A-102N (referred to herein collectively as UEs 102, or in the singular form as UE 102) operating in communication with a radio access network ("RAN") 104. Each of the UEs 102 can be a cellular phone, a feature phone, a smartphone, a mobile computing device, a tablet computing device, a portable television, a portable video game console, or the like capable of communicating with the RAN 104. The UEs 102 can communicate with the RAN 104 by way of one or more eNodeBs ("eNBs"), such as an eNB 106. Although only a single eNB 106 is shown, the RAN 104 can support multiple eNBs configured the same as or similar to the eNB 106.

The RAN 104 can include one or more service areas ("cells") having the same or different cell sizes, which may be represented by different cell-types. As used herein, a "cell" refers to a geographical area that is served by one or more base stations operating within an access network. The cells within the RAN 104 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, and a white space network cell-type. For ease of explanation, a "small cell" cell-type is utilized herein to collectively refer to a group of cell-types that includes femto cell-type, pico cell-type, and micro cell-type, in general contrast to a macro cell-type, which offers a larger coverage area. Other cell-types, including proprietary cell-types and temporary cell-types are also contemplated. Although in the illustrated example, the UEs 102 are shown as being in communication with one RAN (i.e., the RAN 104), the UEs 102 may be in communication with any number of access networks, including networks that incorporate collocated wireless wide area network ("WWAN") WI-FI and cellular technologies, and as such, the UEs 102 can be dual-mode devices.

The RAN 104 can operate in accordance with one or more radio access technologies ("RAT") that utilize mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 104 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102. Data communications can be provided in part by the RAN 104 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 104 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of the RAN 104 operating in accordance with LTE, although those skilled in the art will appreciate the applicability of the concepts and technologies disclosed herein to other cellular technologies, including, in particular, those captured within future generation 3GPP standards. Moreover, in some embodiments, the RAN 104 is or includes one or more virtual RANs ("vRANs").

As used herein, a "base station" refers to a radio receiver and/or transmitter (collectively, transceiver) that is/are configured to provide a radio/air interface over which one or more of the UEs 102 can connect to a network. Accordingly, a base station is intended to encompass one or more base transceiver stations ("BTSs"), one or more NBs, one or more eNBs (e.g., the eNB 106), one or more home eNBs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 102.

The RAN 104 is shown as being in communication with an evolved packet core ("EPC") network 108. The EPC network 108 provides core network functions in accordance with Third Generation Partnership Project ("3GPP") standards specifications. Accordingly, the EPC network 108 can include one or more mobility management entity ("MMEs") 110, one or more serving gateways ("SGWs") 112, one or more packet data network gateways ("PGWs") 114, one or more combination SGW/PGWs (not shown), one or more home subscriber servers ("HSSs") 116, one or more policy and charging rules functions ("PCRFs") (not shown), one or more DIAMETER routing agents ("DRAs") (not shown), one or more DIAMETER edge agents ("DEAs") (not shown), any combination thereof, and/or the like.

The MME 110 can be configured in accordance with 3GPP standards specifications. The MME 110, in general, can perform operations to control signaling traffic related to mobility and security for access to the RAN 104.

The SGW 112 can be configured in accordance with 3GPP standards specifications. The SGW 112 can provide a point of interconnect between the radio-side (e.g., the RAN 104) and the EPC network 108. The SGW 112 serves the UEs 102 by routing incoming and outgoing IP packets. The PGW 114 can be configured in accordance with 3GPP standards specifications. The PGW 114 interconnects the EPC network 108 and one or more external IP networks, such as, in the illustrated embodiment, one or more other networks 118. The other network(s) 118 can include other public land mobile networks ("PLMNs"), PDNs, circuit-switched networks, the Internet, and/or the like.

The PGW 114 routes IP packets to and from the other network(s) 118. The PGW 114 also performs operations such as IP address/IP prefix allocation, policy control, and charging. In some implementations, the PGW 114 and the SGW 112 are deployed as independent network components, as in the illustrated example. In other implementations, the PGW 114 and the SGW 112 can be a combined network component offering functionality of both a PGW and an SGW.

The HSS 116 can be configured in accordance with 3GPP standards specifications. The HSS 116 is a database that contains user-related information for users of devices, such as the UEs 102. The HSS 116 can provide support functions to the MME 110 for mobility management, call and session setup, user authentication, and access authorization.

A PCRF can be configured in accordance with 3GPP standards specifications. A PCRF can determine policy rules, detect service data flows, enforce policies, and perform flow-based charging.

A DRA can be configured in accordance with 3GPP standards specifications. A DRA is a functional element in a 3G or 4G (e.g., LTE) network that provides real-time routing capabilities to ensure that messages are routed among the correct elements within a network. DRAs were introduced by the 3GPP to address the increased DIAMETER signaling traffic and growing complexity of 4G LTE networks. A DRA can provide real-time routing capabilities to ensure that DIAMETER signaling messages are routed to the correct resources in the EPC network 108.

A DEA can be configured in accordance with 3GPP standards specifications. A DEA provides a point of contact into and out of the EPC core network 108 at the DIAMETER application level. A DEA provides secure communications to connect the EPC network 108 to the other network(s) 118 to facilitate internetwork signaling operations (e.g., roaming, charging, and billing), for example, between home and visited PLMN. A DEA can enable DIAMETER signaling traffic to flow core networks while also disguising the topology of the core networks to one another.

The illustrated EPC network 108 also includes an EPC applications microservices broker (referred to herein as "microservices broker" or simply "broker") 120. In the illustrated embodiment, the broker 120 is shown as being implemented as a separate network element operating within the EPC network 108. The broker 120, in some other embodiments, can be implemented as a hardware front-end processor operating as a front-end for the MME 110 or another network element operating within the EPC network 108. The broker 120, alternatively, can be implemented as virtualized network function in a network functions virtualization platform ("NFVP") that serves, at least in part, a software-defined network ("SDN"). An illustrative embodiment of an NFVP is described herein below with reference to FIG. 5.

The broker 120 allows mobile telecommunications carriers to become a provider of mobile applications and create a potential revenue stream. In essence, instead of merely passing data through the network, carriers, utilizing the broker 120, are able to intercept the data and orchestrate services that require data from other mobiles or from back-end data sources. A microservices architecture provides carriers with a unique opportunity to provide these value added services. In a gateway environment, it would be difficult for a carrier to provide these value added services. However, in a microservices architecture, the carrier is in a unique position to intercept all mobile applications data, decide if a microservices request is being issued and whether or not the request can be orchestrated and satisfied by the carrier. The broker 120 provides carriers with an opportunity for further monetization of services associated with mobile applications.

The broker 120 can instruct one or more existing front-end gateways, such as the PGW 114 and/or the SGW 112, to intercept microservice requests 122A-122N (referred to herein collectively as microservice requests 122, or in the singular form as microservice request 122) originating from one or more of the UEs 102 (or all as the case may be). A microservice request 122 includes a request for access to a particular microservice.

As used herein, a "microservice" is defined as a service application that is designed to perform a single simple function. Microservice applications can be developed using a microservices-specific programming language such as Java Orchestration Language Interpreter Engine ("JOLIE"). Other languages, including, for example, HTTP also might be used. The concept of microservices is still in its infancy, and therefore the number of programming languages designed specifically for the development of microservices is presently small. Those skilled in the art will appreciate that as the concept of microservices begins to gain more popularity, the number of programming languages designed specifically for the development of microservices will likely increase. Accordingly, the specific programming language examples disclosed herein should not be construed as being limiting in any way.

The illustrated broker 120 includes (or alternatively can be in communication with) a broker database/repository 124. The broker 120 can maintain in the broker database 124 a plurality of device IDs 126A-126N (referred to herein collectively as device IDs 126, or in the singular form as device ID 126), each associated with one of the UEs 102, and each of the device IDs 126 can be mapped to one or more microservices 128A-128K that the associated UE 102 is capable of servicing. The device IDs 126 can include any identifier that differentiates one UE from another. As one non-limiting example, the device IDs 126 can include an international mobile equipment identity ("IMEI"). Alternatively, the device IDs 126 can include a proprietary ID utilized exclusively for device identification within the broker database 124. The proprietary ID can itself map to another device ID, such as an IMEI.

In the illustrated example, the device ID$_1$ 126A is associated with the UE$_1$ 102A and maps to the microservice$_1$ 128A that the UE$_1$ 102A is capable of servicing; and the device ID$_2$ 126B is associated with the UE$_N$ 102N and maps to the microservice$_1$ 128A, the microservice$_2$ 128B, and the microservice$_K$ 128K that the UE$_N$ 102N is capable of servicing. Although not shown in the illustrated embodiment, the broker database 124 also can include mappings to one or more users, which can be identified by, for example, international mobile subscriber identity ("IMSI"), telephone number, or the like. It should be understood that the broker database 124 can store additional information associated with the UEs 102 and the microservices 128, including, for example, information regarding the destination of the microservice requests 122 and one or more enterprise sources 130A-130N of data and/or application services (referred to herein collectively as enterprise sources 130, or in the singular form as enterprise source 130) that can be utilized to service a microservice request 122 should one of the UEs 102 be incapable of doing so. The enterprise sources 130 can include one or more application servers, databases, repositories, combinations thereof, and/or the like.

When a microservices request 122 is intercepted, the intercepting gateway (e.g., the SGW 112 or the PGW 114) sends the microservice request 122 to the broker 120 that, in turn, determines whether or not other devices attached to the RAN 104 would be able to service the microservice request 122. Additional details in this regard are provided herein below with reference to FIG. 2. In brief, the broker 120 can check the broker database 124 for one or more of the UEs 102 that are capable of servicing the microservice request 122. The broker 120 also can request a status of the UE(s) 102 from the HSS 116. The broker 120 can determine the status based upon a query to the HSS 116 to determine whether the UE(s) 102 are connected or not and the last known location of the UE(s) 102 (e.g., the cell in which the UE(s) 102 last communicated with the RAN 104). The status can indicate whether or not the UE(s) 102 is/are connected to the RAN 104. If the status indicates that the UE(s) 102 is/are connected to the RAN 104, the broker 120 can route the microservice request 122 to the UE(s) 102 for providing the microservice. Alternatively, if the status indicates that the UE(s) 102 is not connected to the RAN 104, the broker 120 can route the microservice request 122 to one or more of the enterprise sources 130 for providing the microservice.

In the illustrated example, the UE$_1$ 102A is acting as a microservice requester device 132 and the UE$_N$ 102N is acting as a microservice server device 134. A microservice requester device 132 is a device that is requesting access to a microservice. The microservice requester device 132 generates the microservice request 122 and sends the microservice request 122 to the EPC network 108 by way of the RAN 104. A microservice server device 134 is a device that the broker 120 determines to be capable of servicing the microservice request 122. The microservice server device 134 can receive, from the broker 120, a forwarded microservice request 136A-136N (shown as "fwd microservice request$_1$ 136A" and "fwd microservice request$_N$ 136N" corresponding to the "microservice request$_1$" and the "microservice request$_N$" (hereinafter referred to collectively as fwd microservice requests 136 or in the singular as fwd microservice request 136). The microservice server device 134 can analyze the fwd microservice request 136 to determine which of the available microservices (microservice$_1$ 128A, microservice$_2$ 128B, or microservice$_K$ 128K) the microservice server device 134 should provide. The microservice server device 134 and the microservice requester device 132 can each include, respectively, a set of available microservices 138N and 138A that correspond to the microservices 128 associated with the corresponding device ID 126 in the broker database 124.

A set of microservices application programming interfaces ("APIs") 140 (generally shown as "APIs 140") can be exposed by the broker 120 and one or more applications (best shown in FIG. 4) can make API calls to the broker 120. An application can interface with the broker 120, issuing and embedding commands and requests in one or more hypertext transfer protocol ("HTTP") strings. Examples of the commands issued via these APIs will now be described. An "EPCBROKERGET" API command can be utilized by an application to retrieve microservices information. In response to the "EPCBROKERGET" API command, the broker 120 can retrieve one or more application services and associated data that are available from one or more backend sources, such as the enterprise sources 130, and can provide the application service(s)/data to the application in response. An "EPCBROKERPOST" API command can be utilized by an application to send log information to the broker 120 and the broker 120, in response, can record activities that have taken place in its logs, databases and repositories as well as backend services logging sources, such as the enterprise sources 130. An "EPCBROKERPUT" API command can be utilized by an application to send data to the broker 120 and the broker 120, in response, can edit the information in a user profile, or data sources associated with backend services. An "EPCBROKERDELETE" API command can be utilized by an application to request deletion of data associated with the application. The broker 120 can determine the backend services that accessed the data and can delete the data from all backend services databases and repositories. It should be understood that these API commands are merely exemplary examples of some of the API commands that can be utilized by an application executing on the UE 102.

Figure 2:
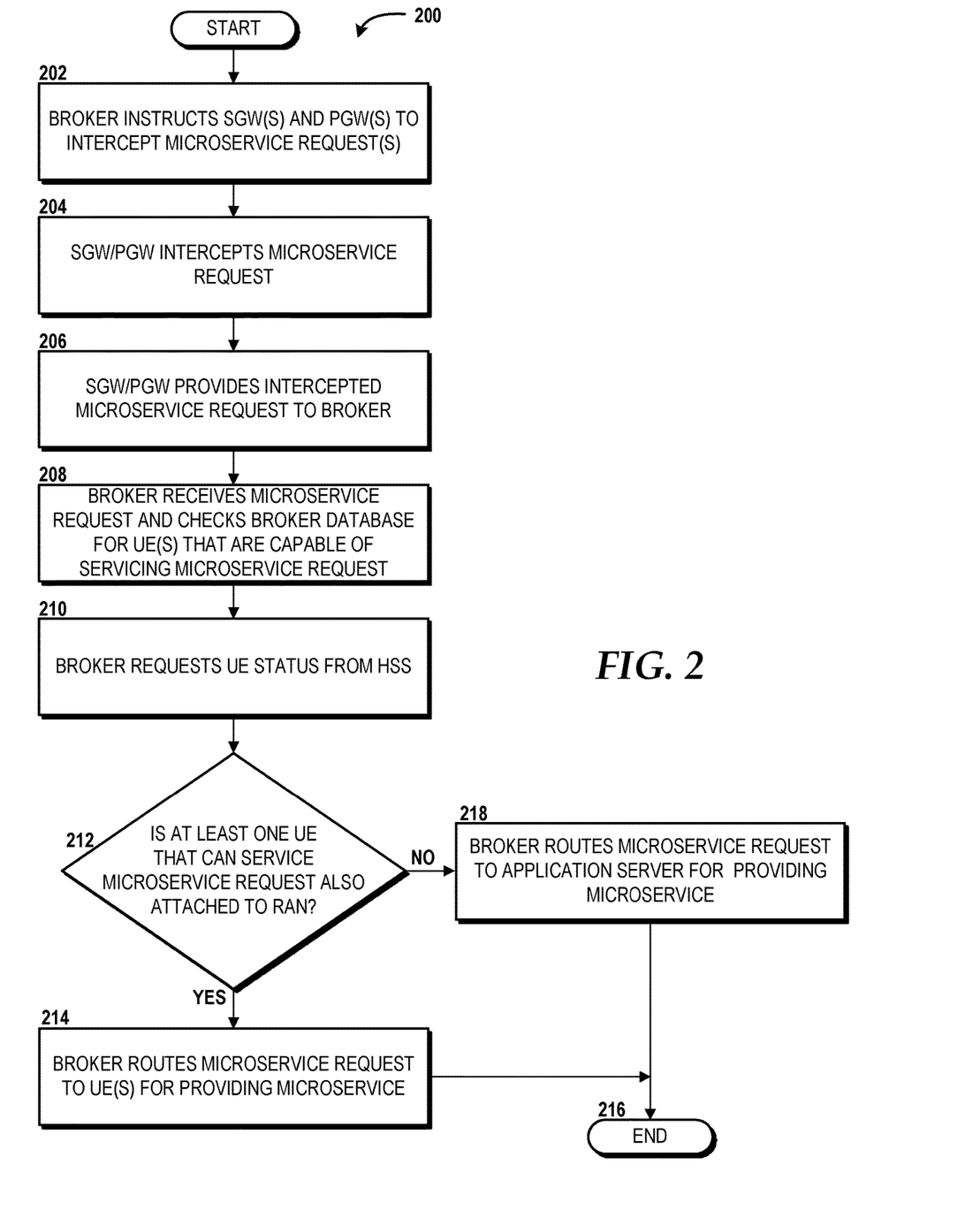
FIG. 2 is a flow diagram illustrating aspects of a method for handling microservice requests, according to an illustrative embodiment.

Turning now to FIG. 2, a flow diagram illustrating aspects of a method 200 for handling microservice requests will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 200 is described as being performed, at least in part, by the broker 120 and the SGW 112 and/or the PGW 114. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins at operation 202, where the broker 120 instructs the SGW 112 and the PGW 114 to intercept microservice requests. From operation 202, the method 200 proceeds to operation 204, where the SGW 112 or the PGW 114 intercepts a microservice request 122. From operation 204, the method 200 proceeds to operation 206, where the SGW 112 or the PGW 114 provides the microservice request 122 to the broker 120. The broker 120 can inspect an HTTP string being issued in the microservice request 122. The broker 120 can then determine if the API call protocols are being followed and then perform the operation requested via its own services or by accessing backend services, such as described herein above.

From operation 206, the method 200 proceeds to operation 208, where the broker 120 receives the microservice request 122 from the SGW 112 or the PGW 114 and checks the broker database 124 for one or more of the UEs 102 that are capable of servicing the microservice request 122. From operation 208, the method 200 proceeds to operation 210, where the broker 120 requests, from the HSS 116, the status of the UE(s) 102 that are capable of servicing the microservice request 122. From operation 210, the method 200 proceeds to operation 212, where the broker 120 determines, based upon communication with the HSS 116, whether at least one of the UEs 102 determined at operation 208 to be capable of servicing the microservice request 122 also is attached to the RAN 104.

If, at operation 212, the broker 120 determines that at least one of the UEs 102 capable of servicing the microservice request 122 also is attached to the RAN 104, the method 200 proceeds to operation 214. At operation 214, the broker 120 routes the forwarded microservice request 136 to the UE(s) 102 for servicing the microservice 128 identified in the microservice request 122. The method 200 then proceeds to operation 216, where the method 200 ends. If, at operation 212, the broker 120 determines that at least one of the UEs 102 capable of servicing the microservice request 122 is not attached to the RAN 104, the method 200 proceeds to operation 218, where the broker 120 routes the microservice request 122 to the enterprise source 130 (such as an application server) that is appropriate for servicing the microservice request 122. From operation 218, the method proceeds to operation 216, where the method 200 ends.

Figure 3:
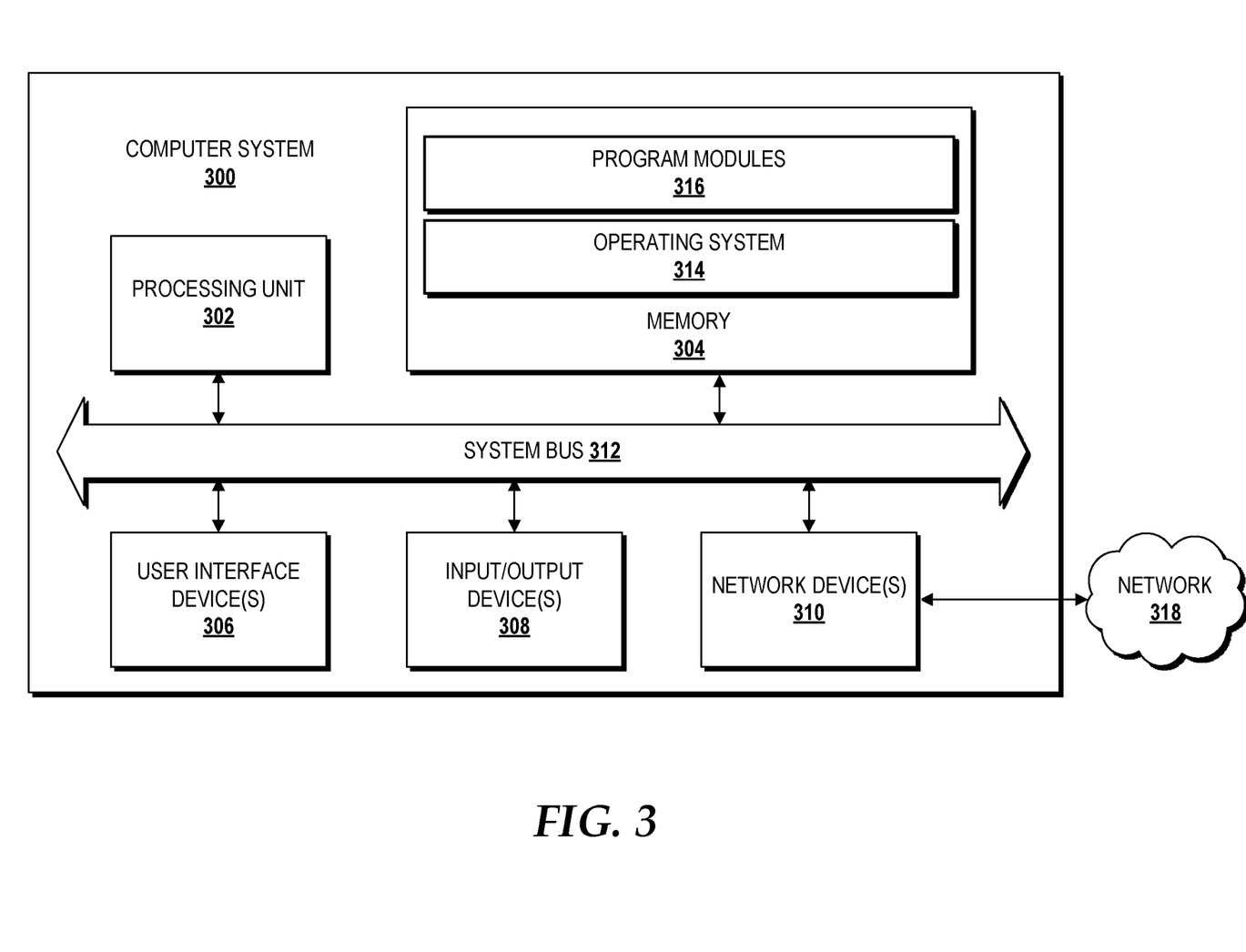
FIG. 3 is a block diagram illustrating an example computer system, according to an illustrative embodiment.

Turning now to FIG. 3 is a block diagram illustrating a computer system 300 configured to provide the functionality in accordance with various embodiments of the concepts and technologies disclosed herein. The systems, devices, and other components disclosed herein can utilize, at least in part, an architecture that is the same as or at least similar to the architecture of the computer system 300. It should be understood, however, that modification to the architecture may be made to facilitate certain interactions among elements described herein.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The illustrated memory 304 includes an operating system 314 and one or more program modules 316. The operating system 314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 316 may include various software and/or program modules to perform the various operations described herein. The program modules 316 and/or other programs can be embodied in computer-readable media containing instructions that, when executed by the processing unit 302, perform various operations such as those described herein. According to embodiments, the program modules 316 may be embodied in hardware, software, firmware, or any combination thereof.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium" and variations thereof does not include waves or signals per se and/or communication media.

The user interface devices 306 may include one or more devices with which a user accesses the computer system 300. The user interface devices 306 may include, but are not limited to, computers, servers, PDAs, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer. In some embodiments, the I/O devices 308 can be used for manual controls for operations to exercise under certain emergency situations.

The network devices 310 enable the computer system 300 to communicate with other networks or remote systems via a network 318. Examples of the network devices 310 include, but are not limited to, a modem, a radio frequency ("RF") or infrared ("IR") transceiver, a telephonic interface, a bridge, a router, or a network card. The network 318 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 318 may be or may include a wired network such as, but not limited to, a Wide Area Network ("WAN"), a wired Personal Area Network ("PAN"), or a wired Metropolitan Area Network ("MAN"). The network 318 can be or can include the RAN 104, the EPC network 108, and/or the other network(s) 118.

Figure 4:
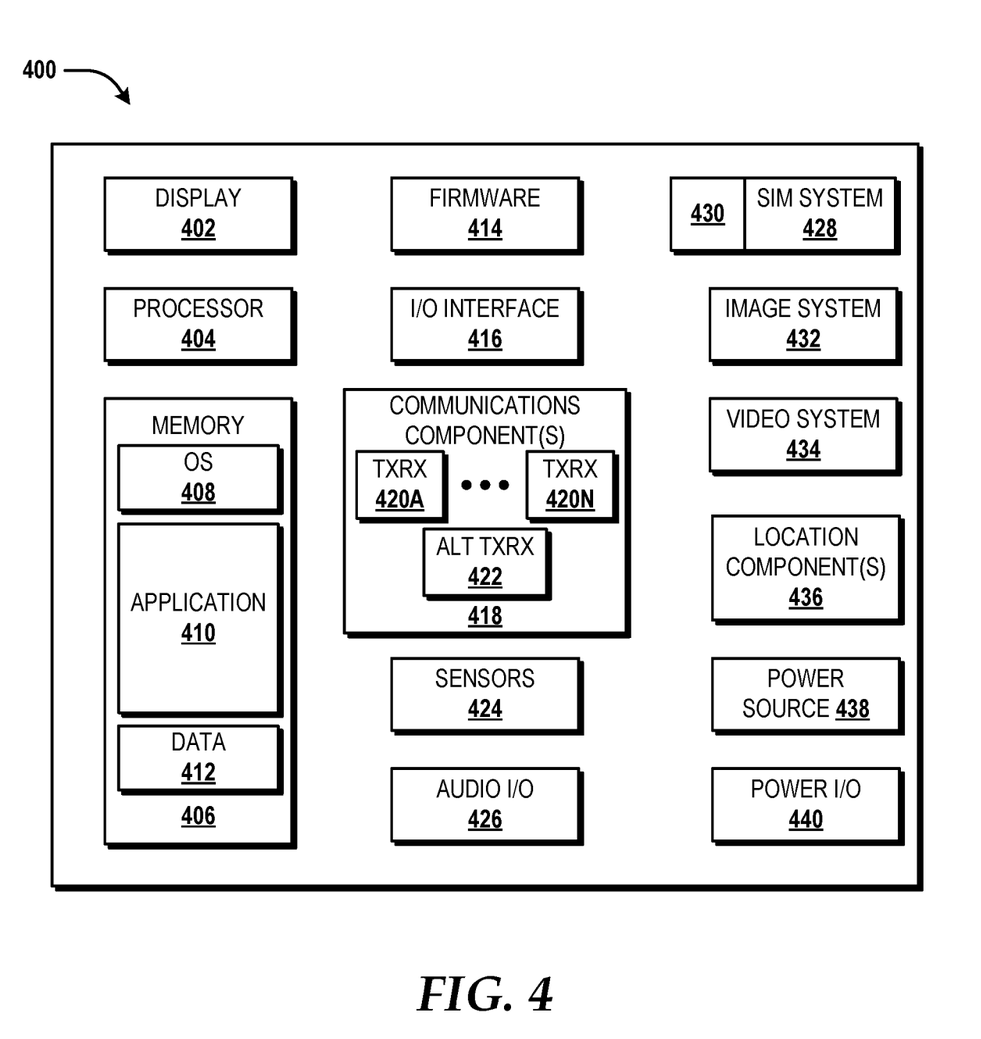
FIG. 4 is a block diagram illustrating an example mobile device, according to an illustrative embodiment.

Turning now to FIG. 4, a block diagram illustrating an example mobile device 400, according to an illustrative embodiment. In some embodiments, one or more of the UEs 102 (shown in FIG. 1) can be configured like the mobile device 400. While connections are not shown between the various components illustrated in FIG. 4, it should be understood that some, none, or all of the components illustrated in FIG. 4 can be configured to interact with one other to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in a memory 406, or the like. In some embodiments, the applications 410 also can include a user interface ("UI") application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering content, viewing account information, answering/initiating calls, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400. The data 412 can include, for example, one or more identifiers, and/or other applications or program modules. According to various embodiments, the data 412 can include, for example, the set of microservices 138, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, user information, organization information, presence status information, user IDs, passwords, and application initiation (start-up) requests. In some embodiments, the I/O interface 416 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 414, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 408 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using GSM, CDMA ONE, CDMA2000, LTE, and various other 2G, 2.5G, 3G, 4G, 5G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 418 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, chargecoupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 428 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

Figure 5:
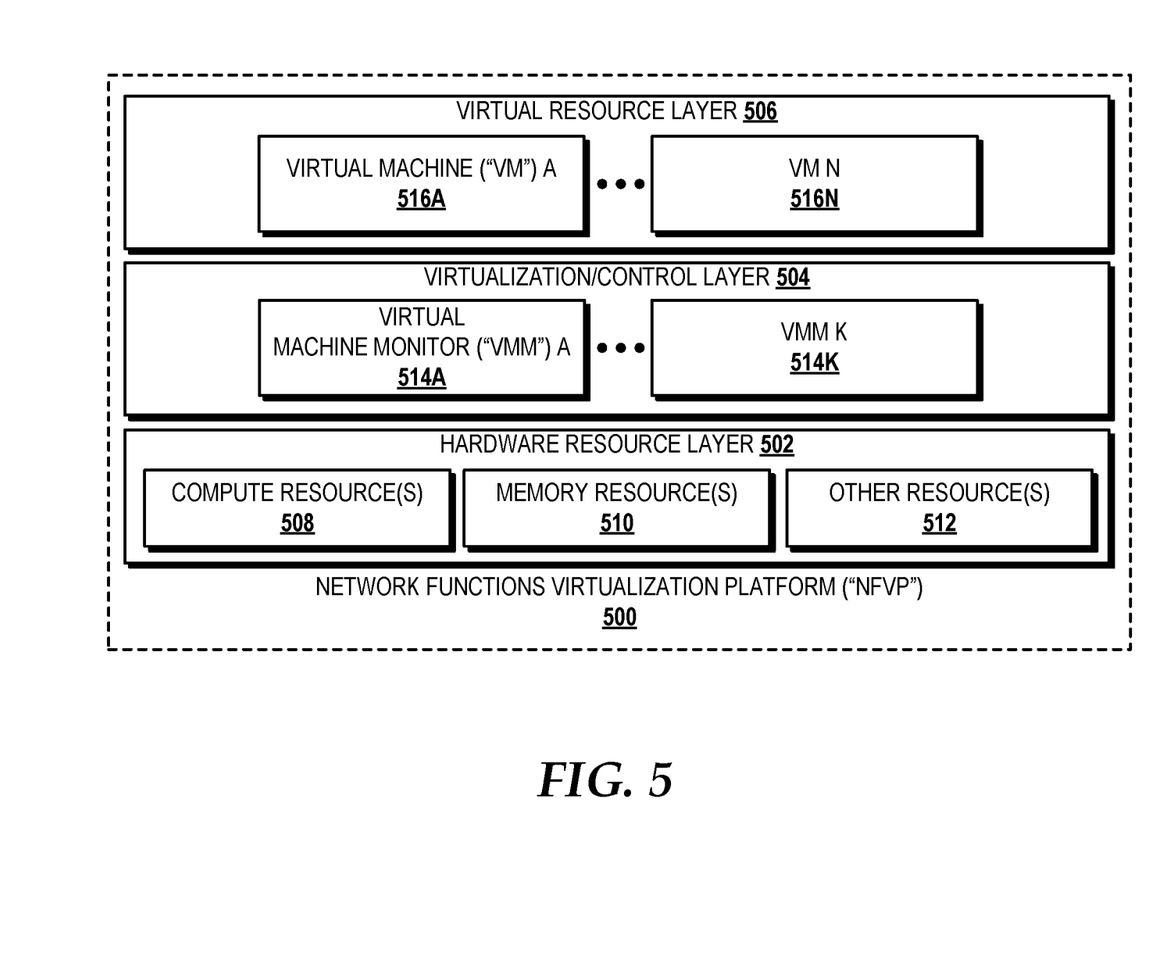
FIG. 5 is a block diagram illustrating an example network functions virtualization platform ("NFVP") capable of implementing aspects of the embodiments presented herein.

Turning now to FIG. 5, a NFVP 500 will be described, according to an exemplary embodiment. The architecture of the NFVP 500 can be used to implement virtual network functions ("VNFs"), such as a VNF to provide the functionality disclosed herein as being provided by the broker 120. The NFVP 500 is a shared infrastructure that can support multiple services and network applications. The illustrated NFVP 500 includes a hardware resource layer 502, a virtualization/control layer 504, and a virtual resource layer 506 that work together to perform operations as will be described in detail herein.

The hardware resource layer 502 provides hardware resources, which, in the illustrated embodiment, include one or more compute resources 508, one or more memory resources 510, and one or more other resources 512. The compute resource(s) 508 can include one or more hardware components that perform computations to process data, and/or to execute computer-executable instructions of one or more application programs, operating systems, and/or other software. The compute resources 508 can include one or more central processing units ("CPUs") configured with one or more processing cores. The compute resources 508 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 508 can include one or more discrete GPUs. In some other embodiments, the compute resources 508 can include CPU and GPU components that are configured in accordance with a co-processing CPU/GPU computing model, wherein the sequential part of an application executes on the CPU and the computationally-intensive part is accelerated by the GPU. The compute resources 508 can include one or more system-on-chip ("SoC") components along with one or more other components, including, for example, one or more of the memory resources 510, and/or one or more of the other resources 512. In some embodiments, the compute resources 508 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 508 can be or can include one or more hardware components architected in accordance with an ARM architecture, available for license from ARM HOLDINGS of Cambridge, United Kingdom. Alternatively, the compute resources 508 can be or can include one or more hardware components architected in accordance with an x86 architecture, such an architecture available from INTEL CORPORATION of Mountain View, Calif., and others. Those skilled in the art will appreciate the implementation of the compute resources 508 can utilize various computation architectures, and as such, the compute resources 508 should not be construed as being limited to any particular computation architecture or combination of computation architectures, including those explicitly disclosed herein.

The memory resource(s) 510 can include one or more hardware components that perform storage operations, including temporary or permanent storage operations. In some embodiments, the memory resource(s) 510 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 508.

The other resource(s) 512 can include any other hardware resources that can be utilized by the compute resources(s) 508 and/or the memory resource(s) 510 to perform operations described herein. The other resource(s) 512 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 502 can be virtualized by one or more virtual machine monitors ("VMMs") 514A-514K (also known as "hypervisors," hereinafter "VMMs 514") operating within the virtualization/control layer 504 to manage one or more virtual resources that reside in the virtual resource layer 506. The VMMs 514 can be or can include software, firmware, and/or hardware that alone or in combination with other software, firmware, and/or hardware, manages one or more virtual resources operating within the virtual resource layer 506.

The virtual resources operating within the virtual resource layer 506 can include abstractions of at least a portion of the compute resources 508, the memory resources 510, the other resources 512, or any combination thereof. These abstractions are referred to herein as virtual machines ("VMs"). In the illustrated embodiment, the virtual resource layer 506 includes VMs 516A-516N (hereinafter "VMs 516"). Each of the VMs 516 can execute one or more applications, such as, for example, a broker application for providing the functionality described herein as being provided by the broker 120.

Figure 6:
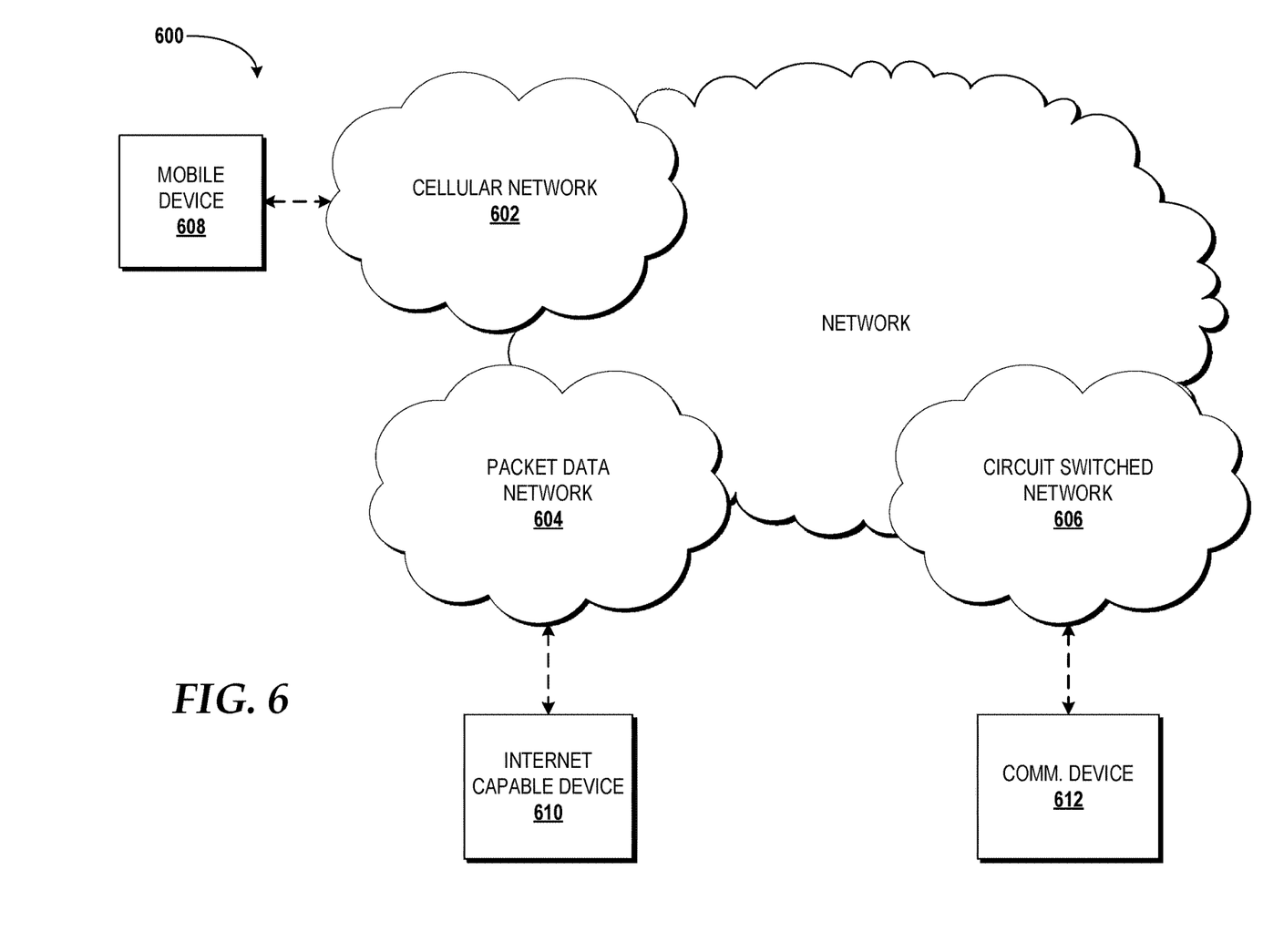
FIG. 6 schematically illustrates a network, according to an illustrative embodiment.

Turning now to FIG. 6, a schematic illustration of a network 600 will be described, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's (such as the eNode B 106), base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the UEs 102, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards. The cellular network 602 can include the RAN 104 and the EPC network 108.

The packet data network 604 includes various devices, for example, servers, computers, databases, and other devices in communication with one another, as is generally known. The packet data network 604 devices are accessible via one or more network links. The servers (e.g., the enterprise sources 130) often store various files that are provided to a requesting device such as, for example, the UEs 102, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail. The packet data network 604 and the circuit switched network 606 can be included in the other networks 118.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like. The network 600 can include the functionality of any of the networks described herein.

Based on the foregoing, it should be appreciated that concepts and technologies directed to an EPC applications microservices broker have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting.

Various modifications and changes may be made to the subject matter described herein without following the example embodiments and applications illustrated and described, and without departing from the true spirit and scope of the embodiments of the concepts and technologies disclosed herein.

What is claimed is:

1. A computer-readable storage medium having instructions stored thereon that, when executed by a processor of a microservices broker, cause the microservices broker to perform operations comprising:

instructing an evolved packet core gateway of an evolved packet core network of a mobile telecommunications carrier to determine microservice requests from mobile applications data passing through the evolved packet core network of the mobile telecommunications carrier and to intercept the microservice requests from the mobile applications data passing through the evolved packet core network of the mobile telecommunications carrier, wherein the evolved packet core network of the mobile telecommunications carrier includes the microservices broker;

receiving, from the evolved packet core gateway, a microservice request of the microservice requests intercepted by the evolved packet core gateway, wherein the microservice request includes a request to access a microservice, wherein the microservice is a service application that is designed to perform a single function;

checking a microservices broker database to determine a user equipment associated with the service application of the microservice request that is designed to perform the single function, wherein the microservices broker database stores a plurality of device identifiers, wherein each device identifier of the plurality of device identifiers is associated with a respective user equipment of a plurality of user equipment, and wherein each device identifier of the plurality of device identifiers is associated with a different service application that the respective user equipment of the plurality of user equipment is capable of servicing;

requesting, from a home subscriber server, a status of the user equipment determined to be associated with the service application of the microservice request that is designed to perform the single function;

receiving, from the home subscriber server, the status of the user equipment, wherein the status of the user equipment received from the home subscriber server indicates whether the user equipment is attached to a radio access network;

determining, based on the status of the user equipment received from the home subscriber server, whether the user equipment is attached to the radio access network;

in response to determining from the status of the user equipment received from the home subscriber server that the user equipment is attached to the radio access network, routing the microservice request to the user equipment for performing the single function by the service application associated with the user equipment; and in response to determining from the status of the user equipment received from the home subscriber server that the user equipment is not attached to the radio access network, routing the microservice request to an enterprise source for providing the microservice based on information regarding the enterprise source stored by the microservices broker.

2. The computer-readable storage medium of claim 1, wherein the evolved packet core gateway comprises a serving gateway, and wherein the microservice request originates from another user equipment.

3. The computer-readable storage medium of claim 1, wherein the evolved packet core gateway comprises a packet gateway, and wherein the microservice request originates from an outside network.

4. The computer-readable storage medium of claim 1, wherein the operations further comprise:

receiving a further microservice request that identifies a further microservice;

checking the microservices broker database for a further user equipment that is capable of servicing the further microservice request;

requesting a further status of the further user equipment from the home subscriber server;

determining, based upon the further status of the further user equipment, whether the further user equipment is attached to the radio access network; and in response to determining that the user equipment is attached to the radio access network, routing the further microservice request to the further user equipment for providing the further microservice.

5. The computer-readable storage medium of claim 4, wherein the user equipment associated with the service application of the microservice request that is designed to perform the single function and the further user equipment providing the further microservice constitute providing a composite service comprised of the microservice and the further microservice.

6. The computer-readable storage medium of claim 1, wherein the operations further comprise:

exposing a set of microservices application programming interfaces;

receiving, from the service application associated with the user equipment, an application programming interface command comprising data associated with the service application; and in response to the application programming interface command, recording the data associated with the service application in the microservices broker database in association with the user equipment associated with the service application.

7. A method comprising:

instructing, by a microservices broker comprising a processor that executes a microservices broker application, an evolved packet core gateway of an evolved packet core network of a mobile telecommunications carrier to determine microservice requests from mobile applications data passing through the evolved packet core network of the mobile telecommunications carrier and to intercept the microservice requests from the mobile applications data passing through the evolved packet core network of the mobile telecommunications carrier, wherein the evolved packet core network of the mobile telecommunications carrier includes the microservices broker;

receiving, by the microservices broker, from the evolved packet core gateway, a microservice request of the microservice requests intercepted by the evolved packet core gateway, wherein the microservice request includes a request to access a microservice, wherein the microservice is a service application that is designed to perform a single function;

checking, by the microservices broker, a microservices broker database to determine a user equipment associated with the service application of the microservice request that is designed to perform the single function, wherein the microservices broker database stores a plurality of device identifiers, wherein each device identifier of the plurality of device identifiers is associated with a respective user equipment of a plurality of user equipment, and wherein each device identifier of the plurality of device identifiers is associated with a different service application that the respective user equipment of the plurality of user equipment is capable of servicing;

requesting, by the microservices broker, from a home subscriber server, a status of the user equipment determined to be associated with the service application of the microservice request that is designed to perform the single function;

receiving, by the microservices broker, from the home subscriber server, the status of the user equipment, wherein the status of the user equipment received from the home subscriber server indicates whether the user equipment is attached to a radio access network;

determining, by the microservices broker, based upon the status of the user equipment received from the home subscriber server, whether the user equipment is attached to the radio access network;

in response to determining from the status of the user equipment received from the home subscriber server that the user equipment is attached to the radio access network, routing, by the microservices broker, the microservice request to the user equipment for performing the single function by the service application associated with the user equipment; and in response to determining from the status of the user equipment received from the home subscriber server that the user equipment is not attached to the radio access network, routing, by the microservices broker, the microservice request to an enterprise source for providing the microservice based on information regarding the enterprise source stored by the microservices broker.

8. The method of claim 7, wherein the evolved packet core gateway comprises a serving gateway, and wherein the microservice request originates from another user equipment.

9. The method of claim 7, wherein the evolved packet core gateway comprises a packet gateway, and wherein the microservice request originates from an outside network.

10. The method of claim 7, further comprising:
receiving, by the microservices broker, a further microservice request that identifies a further microservice;
checking, by the microservices broker, the microservices broker database for a further user equipment that is capable of servicing the further microservice request;
requesting, by the microservices broker, a further status of the further user equipment from the home subscriber server;
determining, by the microservices broker, based upon the further status of the further user equipment, whether the further user equipment is attached to the radio access network; and
in response to determining that the user equipment is attached to the radio access network, routing, by the microservices broker, the further microservice request to the further user equipment for providing the further microservice.

11. The method of claim 10, wherein the user equipment associated with the service application of the microservice request that is designed to perform the single function and the further user equipment providing the further microservice constitute providing a composite service comprised of the microservice and the further microservice.

12. The method of claim 7, further comprising:
exposing, by the microservices broker, a set of microservices application programming interfaces;
receiving, by the microservices broker, from the service application associated with the user equipment, an application programming interface command comprising data associated with the service application; and
in response to the application programming interface command, recording by the microservices broker, the data associated with the service application in the microservices broker database in association with the user equipment associated with the service application.

13. A microservices broker comprising:
a processor; and
a memory that stores instructions that, when executed by the processor, causes the microservices broker to perform operations comprising
instructing an evolved packet core gateway of an evolved packet core network of a mobile telecommunications carrier to determine microservice requests from mobile applications data passing through the evolved packet core network of the mobile telecommunications carrier and to intercept the microservice requests from the mobile applications data passing through the evolved packet core network of the mobile telecommunications carrier, wherein the evolved packet core network of the mobile telecommunications carrier includes the microservices broker,
receiving, from the evolved packet core gateway, a microservice request of the microservice requests intercepted by the evolved packet core gateway, wherein the microservice request includes a request to access a microservice, wherein the microservice is a service application that is designed to perform a single function,
checking a microservices broker database to determine a user equipment associated with the service application of the microservice request that is designed to perform the single function, wherein the microservices broker database stores a plurality of device identifiers, wherein each device identifier of the plurality of device identifiers is associated with a respective user equipment of a plurality of user equipment, and wherein each device identifier of the plurality of device identifiers is associated with a different service application that the respective user equipment of the plurality of user equipment is capable of servicing,
requesting, from a home subscriber server, a status of the user equipment determined to be associated with the service application of the microservice request that is designed to perform the single function,
receiving, from the home subscriber server, the status of the user equipment, wherein the status of the user equipment received from the home subscriber server indicates whether the user equipment is attached to a radio access network,
determining, based upon the status of the user equipment received from the home subscriber server, whether the user equipment is attached to the radio access network, in response to determining from the status of the user equipment received from the home subscriber server that the user equipment is attached to the radio access network, routing the microservice request to the user equipment for performing the single function by the service application associated with the user equipment, and in response to determining from the status of the user equipment received from the home subscriber server that the user equipment is not attached to the radio access network, routing the microservice request to an enterprise source for providing the microservice based on information regarding the enterprise source stored by the microservices broker.

14. The microservices broker of claim 13, wherein the evolved packet core gateway comprises a serving gateway or a packet gateway.

15. The microservices broker of claim 13, wherein the operations further comprise:

receiving a further microservice request that identifies a further microservice;

checking the microservices broker database for a further user equipment that is capable of servicing the further microservice request;

requesting a further status of the further user equipment from the home subscriber server;

determining, based upon the further status of the further user equipment, whether the further user equipment is attached to the radio access network; and in response to determining that the user equipment is attached to the radio access network, routing the further microservice request to the further user equipment for providing the further microservice.

16. The microservices broker of claim 15, wherein the user equipment associated with the service application of the microservice request that is designed to perform the single function and the further user equipment providing the further microservice constitute providing a composite service comprised of the microservice and the further microservice.

17. The microservices broker of claim 13, wherein the microservice request originates from another user equipment.

18. The microservices broker of claim 13, wherein the microservice request originates from an outside network.

19. The microservices broker of claim 13, wherein the operations further comprise:

exposing a set of microservices application programming interfaces;

receiving, from the service application associated with the user equipment, an application programming interface command comprising data associated with the service application; and in response to the application programming interface command, recording the data associated with the service application in the microservices broker database in association with the user equipment associated with the service application.

* * * * *